United States Patent
Giffin et al.

(10) Patent No.: US 8,695,324 B2
(45) Date of Patent: Apr. 15, 2014

(54) MULTISTAGE TIP FAN

(75) Inventors: Rollin George Giffin, Cincinnati, OH (US); James Edward Johnson, Cincinnati, OH (US)

(73) Assignee: General Electric Co., Schenectady, NY (US)

( * ) Notice: Subject to any disclaimer, the term of this patent is extended or adjusted under 35 U.S.C. 154(b) by 981 days.

(21) Appl. No.: 12/796,353

(22) Filed: Jun. 8, 2010

(65) Prior Publication Data
US 2011/0120082 A1  May 26, 2011

Related U.S. Application Data

(60) Provisional application No. 61/263,119, filed on Nov. 20, 2009.

(51) Int. Cl.
*F02K 3/02* (2006.01)

(52) U.S. Cl.
USPC ............ 60/226.1; 60/226.3; 60/262

(58) Field of Classification Search
CPC ........... F02K 3/06; F02K 3/065; F02K 3/075; F02K 1/386
USPC ............ 60/226.1, 226.3, 204, 268, 262, 792; 415/145
See application file for complete search history.

(56) References Cited

U.S. PATENT DOCUMENTS

| | | | |
|---|---|---|---|
| 5,402,638 A | 4/1995 | Johnson | |
| 5,404,713 A | 4/1995 | Johnson | |
| 5,694,767 A | 12/1997 | Vdoviak et al. | |
| 5,809,772 A | 9/1998 | Giffin, III et al. | |
| 5,867,980 A * | 2/1999 | Bartos | 60/226.3 |
| 5,988,980 A | 11/1999 | Busbey et al. | |
| 6,672,072 B1 | 1/2004 | Giffin, III | |
| 7,144,221 B2 | 12/2006 | Giffin | |
| 7,395,657 B2 | 7/2008 | Johnson | |
| 7,631,484 B2 | 12/2009 | Giffin et al. | |
| 2005/0081509 A1* | 4/2005 | Johnson | 60/226.1 |
| 2006/0024162 A1* | 2/2006 | Giffin | 415/208.3 |
| 2007/0209368 A1* | 9/2007 | Giffin et al. | 60/804 |
| 2008/0141650 A1 | 6/2008 | Johnson | |
| 2008/0141655 A1* | 6/2008 | Johnson et al. | 60/226.3 |
| 2008/0141676 A1* | 6/2008 | Johnson | 60/785 |
| 2008/0155961 A1 | 7/2008 | Johnson | |

FOREIGN PATENT DOCUMENTS

| | | | |
|---|---|---|---|
| EP | 1510682 A2 | 3/2005 | |
| EP | 1533510 A2 | 5/2005 | |

OTHER PUBLICATIONS

Search Report from EP Application No. 10190781.4 dated Dec. 6, 2013.

* cited by examiner

*Primary Examiner* — Rinaldi Rada
*Assistant Examiner* — Omar Morales
(74) *Attorney, Agent, or Firm* — General Electric Co.; Steven J. Rosen

(57) ABSTRACT

A fan assembly having an outer fan system is disclosed, the fan assembly comprising an outer fan first stage and an outer fan second stage both extending radially outward from an arcuate platform.

27 Claims, 5 Drawing Sheets

MULTISTAGE TIP FAN

CROSS-REFERENCE TO RELATED APPLICATIONS

This Application claims priority to U.S. Provisional Application Ser. No. 61/263,119, filed Nov. 20, 2009, which is herein incorporated by reference in its entirety.

BACKGROUND OF THE INVENTION

This invention relates generally to jet propulsion engines, and more specifically to fans having multistage cascade of outer airfoils mounted on fan blades.

An aircraft gas turbine engine typically includes a fan and a compressor. The compressor provides pressurized air to a combustor wherein the air is mixed with fuel and ignited for generating hot-high-pressure combustion gases. These gases flow downstream to one or more turbines that extract energy therefrom to power the fan and compressor and further expand to provide useful thrust for powering an aircraft in flight. In a turbofan engine, which typically includes a fan placed at the front of the core engine, a high pressure turbine powers the compressor of the core engine. A low pressure turbine is disposed downstream from the high pressure turbine for powering the fan.

In the art, some known gas turbine engine configurations incorporate an aft fan stage integral with a turbine rotor that is located near the aft end of the engine. In the art, fan configurations on a blade are referred to as a Fan on Blade ("FLADE™"). In a known blade/FLADE™, a radially inner portion of the blade works as a turbine blade that extracts energy from a flow of a hot combustion gas stream and a radially outer portion of the blade (FLADE™) works as a fan to impart energy into a flow of a relatively cooler air stream to raise its pressure. At least some known configurations of a FLADE™ on a turbine blade require an additional turbine stage and/or an additional turbine spool and related bearings, sumps, and other support structures. At least in some known applications, when the FLADE™ is located near the aft end of the engine, the axial distance available to collect and redistribute the combined flow may not be adequate and may have a high total pressure loss in the FLADE™ flow. The FLADE™ mounting on an aft located turbine may present difficulties in the installation of the engine into an aircraft if the FLADE™ flow needs to be directed from the engine to a site remote from the engine. A single stage FLADE™ may not be adequate to provide the required increase in pressure ratios in some applications. Also, a well known turbine design parameter, AN^2, where A is the annulus exit area and N is the rotational speed, may be made larger by the addition of a single-stage FLADE™ area. A large increase of the AN^2 parameter may require an extra-ordinarily heavy stage weight.

Accordingly, it would be desirable to have a multi-stage FLADE™ mounted on a fan stage located near the forward portion of a gas turbine engine. It would be desirable to have a fan FLADE™ that is capable of providing increased pressure ratio. It would be desirable to have a fan FLADE™ mounting that enhances the installation of the engine into an aircraft wherein the FLADE™ flow is capable of being directed to the engine exhaust nozzle or from the engine to a site remote from the engine.

BRIEF DESCRIPTION OF THE INVENTION

The above-mentioned need or needs may be met by exemplary embodiments disclosed herein which provide a fan assembly having an outer fan system comprising an outer fan first stage having at least one outer fan first blade extending radially outward from an arcuate platform and an outer fan second stage comprising at least one outer fan second blade extending radially outward from the arcuate platform and located axially aft from the outer fan first stage. In one embodiment, a fan assembly having an outer fan system further comprises a convertible fan system adapted to have a variable fan pressure ratio while an air flow into the convertible fan system remains substantially constant.

BRIEF DESCRIPTION OF THE DRAWINGS

The subject matter, which is regarded as the invention, is particularly pointed out and distinctly claimed in the concluding part of the specification. The invention, however, may be best understood by reference to the following description taken in conjunction with the accompanying figures in which:

DETAILED DESCRIPTION OF THE INVENTION

Figure 1:
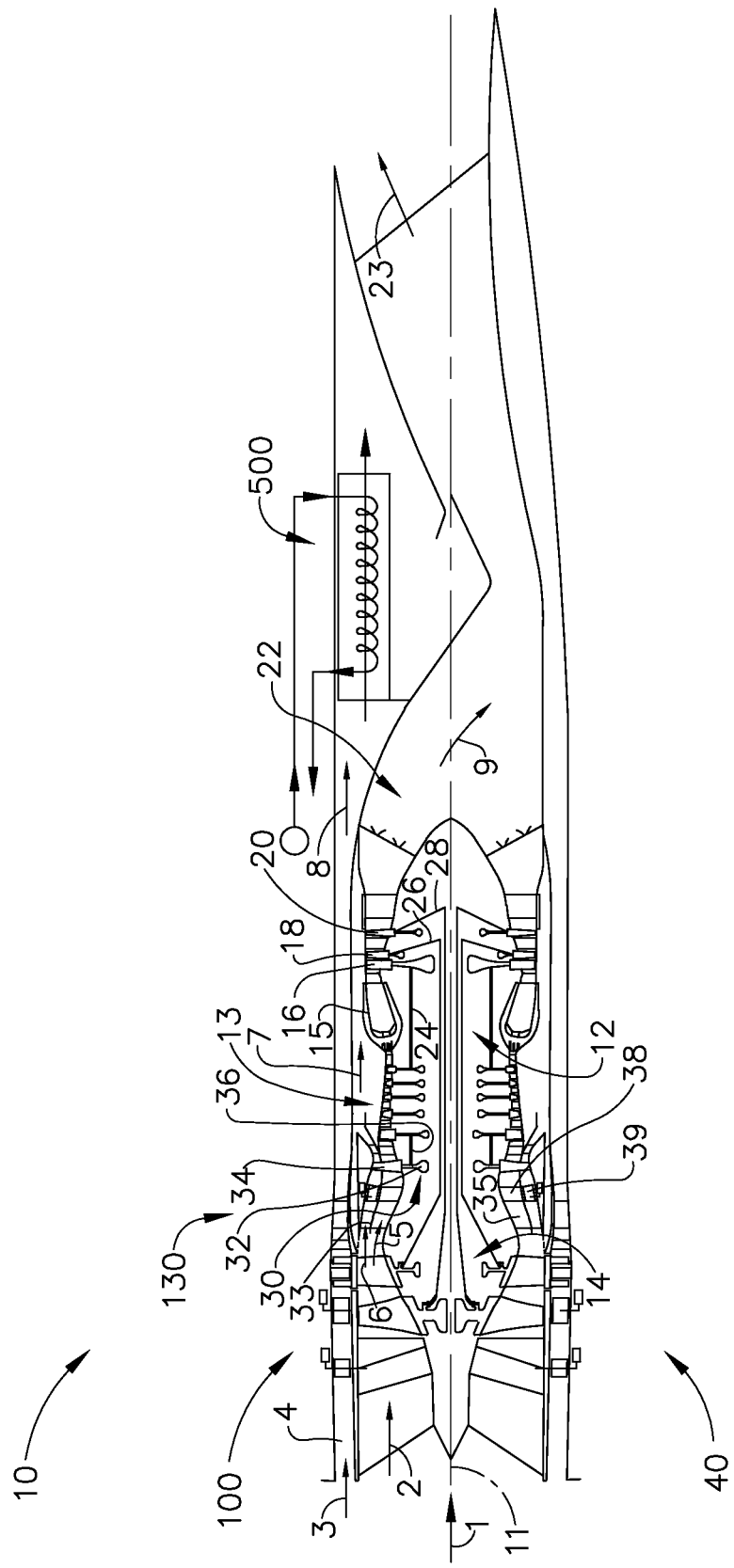
FIG. 1 is a schematic cross-sectional view of an exemplary gas turbine engine constructed according to an aspect of the present invention.

Referring to the drawings wherein identical reference numerals denote the same elements throughout the various views, FIG. 1 is a schematic cross-sectional view of an exemplary gas turbine engine 10 constructed according to an exemplary embodiment of the present invention. The gas turbine engine 10 has a fan 14, a core 12 comprising a compressor 13 driven by a high-pressure turbine (HPT) 16 and shaft 24. In the exemplary embodiment shown in FIG. 1, the fan 14 comprises an optional convertible fan system 40. The engine 10 has a longitudinal axis 11. The first stage of fan 14 is driven by a low-pressure turbine 20 (LPT) and shaft 28. A second stage of the fan 14 is driven by a low-pressure turbine 18 and shaft 26. The HPT 16 and LPTs 18, 20 are driven by the hot combustion gases from a combustor 15. The exemplary embodiment of engine 10 has an outer flow passage 4 that receives an outer flow stream 3 and has an exemplary outer fan system 130 as described subsequently herein. The inlet air flow stream 1 enters the front of the engine 10. The fan flow stream 2 is pressurized by the fan 14 and splits into one or more bypass flow streams 6 and a core flow stream 5. The one or more bypass flow streams 6 bypass the core 12 of the engine and forms a mixed flow stream 7 that subsequently enters the exhaust system 22 having an inner exhaust stream 9. A convertible fan system 40 may be optionally used in the engine 10 to vary the fan pressure ratios as needed during various operating regimes of the engine 10. In FIG. 1 an exemplary convertible fan 40 is shown as being driven by the HPT 16. A fan 30, such as shown in FIG. 1, driven by the HPT 16 is known as a core-driven-fan stage. The exemplary convertible fan shown in FIG. 1 driven by the HPT is a core driven fan (CDF) having CDF blades 34 on a CDF rotor 32 that is coupled to the compressor 13 using a CDF shaft 36. The exemplary convertible fan system 40 has a radially inner vane 38 and an outer vane 39 that is variable using known methods. In alternative embodiments, the convertible fan 40 may be driven by an LPT as described subsequently herein (see FIG. 5). The core flow stream 5 enters the core 12 of the engine and is further compressed by the compressor 13 before entering the combustor 15. The core bypass flows 6, 7 and the exhaust stream from the LPT are mixed to form the inner exhaust stream 9 which is further expanded in the exhaust system 22, forming the engine exhaust flow stream 23. In some applications, a portion of the outer flow stream 3 may also be included in the exhaust flow stream 23.

Figure 2:
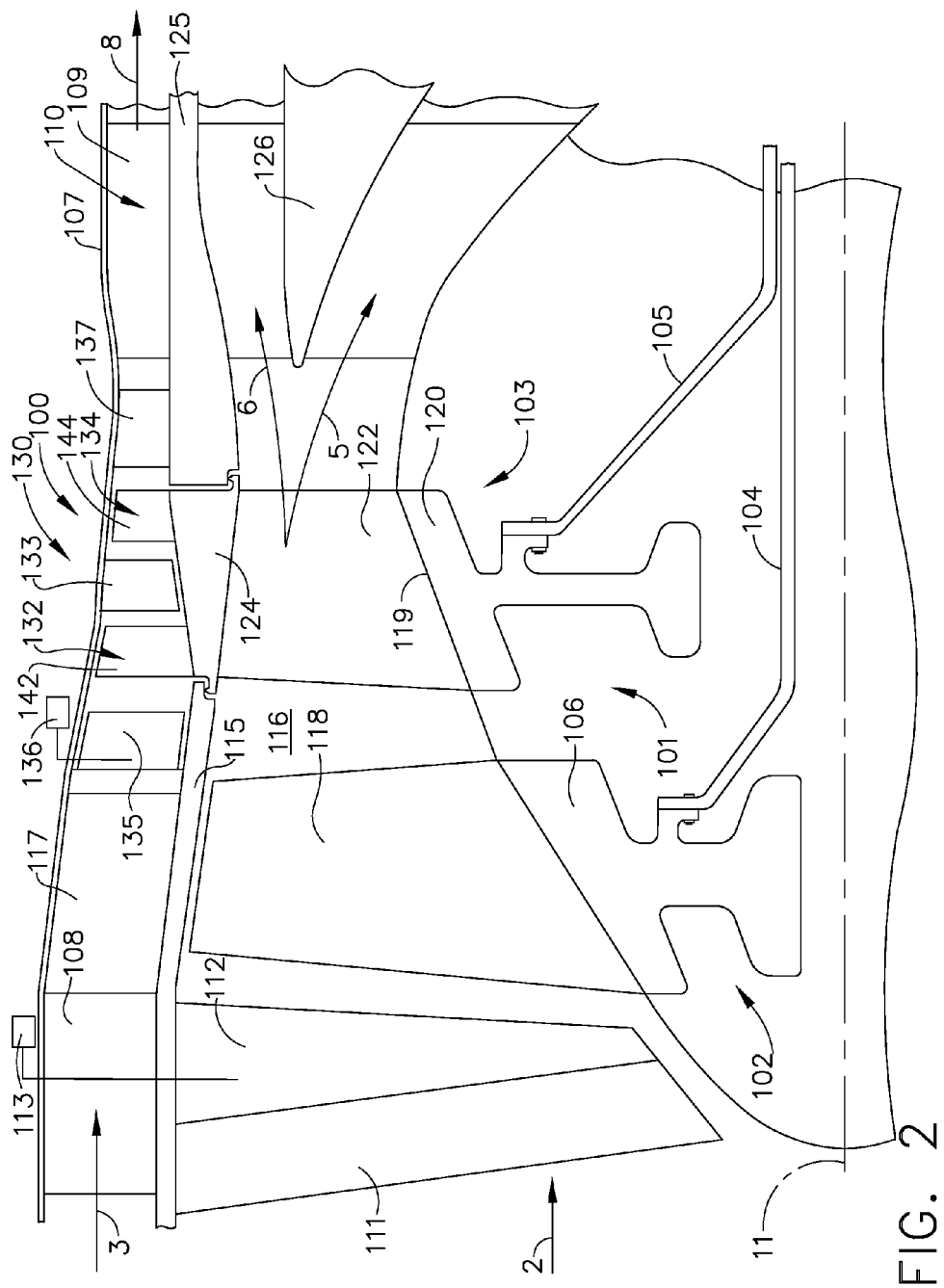
FIG. 2 is a schematic cross-sectional view of a counter-rotating fan portion of the gas turbine engine shown in FIG. 1 having a rear fan stage constructed according to an aspect of the present invention.

FIG. 2 is a schematic cross-sectional view of a counter-rotating fan portion of the gas turbine engine 10 shown in FIG. 1 having a rear fan stage 103 constructed according to an aspect of the present invention. Referring to FIG. 2, the fan assembly 100 comprises a fan rotor 120 having a hub 119, a plurality of fan blades 122 extending radially outward from the hub 119 and arranged circumferentially around a longitudinal axis 11. Each fan blade 122 has an arcuate platform 124 located at a radially outward portion of the fan blade 122. In the assembled state of the fan assembly 100, a portion of an annular fan inner flow path 116 is defined between the hub 119 and the arcuate platform 124. During operation of the fan assembly in an engine, such as for example shown in FIG. 1, the fan blades 122 increase the pressure of a fan flow stream 2 flowing through the annular flow path 116. The exemplary embodiment of the present invention shown in FIG. 2 comprises an outer fan system 130 having an outer fan first stage 132 having a plurality of outer fan first blades 142, and an axially aft outer fan second stage 134 having a plurality of outer fan second blades 144. One or more outer fan first blades 142 extend radially outward from the arcuate platform 124 of the fan blade 122. One or more outer fan second blades 144 extend radially outward from the arcuate platform 124 and are located axially aft from the outer fan first blades 142. The outer fan first blades 142 and outer fan second blades 144 have conventional airfoil shapes made using known materials such as Titanium and known manufacturing methods. The exemplary embodiment of the present invention shown in FIG. 2 comprises a circumferential row of inter-stage vanes 133 located axially aft from the outer fan first stage 132 and forward from the outer fan second stage 134. The inter-stage vanes 133 have conventional airfoil shapes and are oriented so as to remove a portion of the tangential velocity imparted by the first stage and redirect the flow from the outer fan first stage 132 into the outer fan second stage 134. In some applications, the inter-stage vanes 133 may have variable orientations (variable vanes) operated using known actuators (not shown in FIG. 2). During operation of the outer fan system 130 in an engine (see FIG. 1 for example), the outer fan first blades 142 raise the pressure of an outer flow stream 3 that flows through an outer flow path 117 and the outer fan first stage 132. The outer fan second blades 142 further raise the pressure of the outer flow stream 3 and exits the flow as pressurized outer fan exhaust stream 8 in the outer flow path defined at least partially by the outer casing 107. A circumferential row of outer fan outlet guide vanes (OGV) 137 is located axially aft from the outer fan second stage 134. The OGVs 137 re-orient the flow exiting from the outer fan second stage 134 to the axial direction. A circumferential row of outer fan inlet guide vanes (IGVs) 135 are located axially forward from the outer fan first stage 132 in the outer flow path 117. The outer fan inlet guide vanes 135 may have variable vanes that are capable of changing the volume flow rate, at constant speed, by changing the absolute flow direction of gas entering the outer fan first stage 132 using known actuators 136 that rotate the vanes to change the stagger of the vanes. The operation of the outer fan system 130 is controlled by modulating the mass flow rate and pressure ratio of the outer fan system 130 by using the actuators 136 coupled to the outer fan inlet guide vanes (IGVs) 135.

Figure 3:
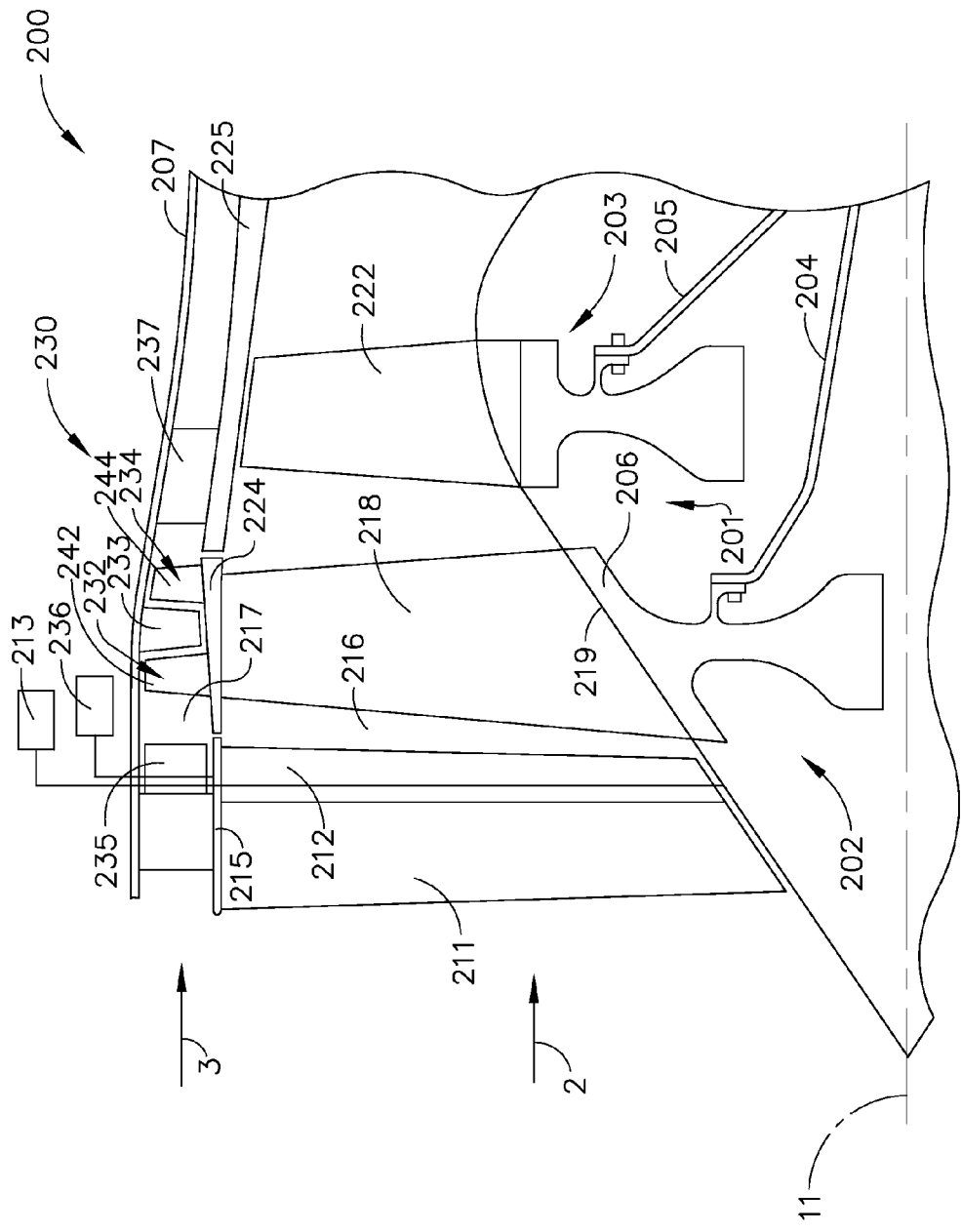
FIG. 3 is a schematic cross-sectional view of another embodiment of the present invention showing a counter-rotating fan portion of a gas turbine engine having a front fan stage constructed according to an aspect of the present invention.

FIG. 3 is a schematic cross-sectional view of another embodiment of the present invention showing a counter-rotating fan portion of a gas turbine engine 10 having a front fan stage 202 constructed according to an aspect of the present invention. FIGS. 2 and 3 show schematically exemplary embodiments of the present invention of a fan system 101, 201 having multiple stages of fan rotors. The exemplary embodiment shown in FIGS. 2 and 3 have a first fan stage 102, 202 comprising a first stage fan rotor 106, 206 driven by a first drive shaft 104, 204 rotating in a first direction and a second fan stage 103, 203 comprising a second stage fan rotor 120 driven by a second drive shaft 105, 205 rotating in a second direction. The first drive shaft 104, 204 is coupled to and driven by a low-pressure turbine stage (not shown in FIGS. 2 and 3, but see FIG. 1 items 20 and 28 for example). The second drive shaft 105, 205 is coupled to and driven by another low-pressure turbine stage (not shown in FIGS. 2 and 3, but see FIG. 1 items 18 and 26 for example). In the exemplary embodiments of the present invention of a fan system shown in FIGS. 1, 2 and 3, the main fan stages 102, 103 (and 202, 203) are "counter-rotating" in that the first fan stage 102, 202 rotates in one direction (such as clock-wise forward-looking-aft) and the second fan stage 103, 203 rotates in another direction (such as counter clock-wise forward-looking-aft) along with the corresponding low-pressure turbines that drive them. The alternative embodiments of the present invention of a fan system shown in FIGS. 4 and 5, the main fan stages 302, 303 (402, 403 in FIG. 5) are coupled to each other and rotate in the same direction ("co-rotating"). During operation, the main fan stages pressurize an incoming flow of air stream 2 and generates a flow bypass stream 6 and a core flow stream 5. A static splitter, such as item 126 in FIG. 2 (item 326 in FIG. 4 and item 451 in FIG. 5) splits the flow stream exiting the main fan stages into the core and bypass streams. The exemplary embodiment of the present invention of a fan system 101 shown in FIG. 2 may optionally have a circumferential row of inlet guide vanes 111 located axially forward from the first fan stage 102. Further, optionally, the inlet guide vanes 111 are capable of changing the direction of at least a portion of the flow of gas entering the first fan stage 102 using an actuator 113. Known variable IGVs and actuators can be used.

FIG. 2 shows the preferred embodiment of the outer fan system 130, described previously herein, wherein the outer fan system 130 is supported and driven by the second fan stage 103 rotor 120. FIG. 3 shows an alternative embodiment wherein the outer fan system 230 is supported and driven by the first fan stage 202. The outer fan system 230 has an outer fan first stage 232 having a circumferential row of outer fan first blades 242, an outer fan second stage 234 having a circumferential row of outer fan second blades 244 located axially aft from the outer fan first stage 232 and a circumferential row of inter-stage vanes 233 located axially aft from the outer fan first stage 232, and a circumferential row of outer fan inlet guide vanes 235 located axially forward from the outer fan first stage 232. Other features are similar to the embodiment shown in FIG. 2 with corresponding item numbers.

Figure 4:
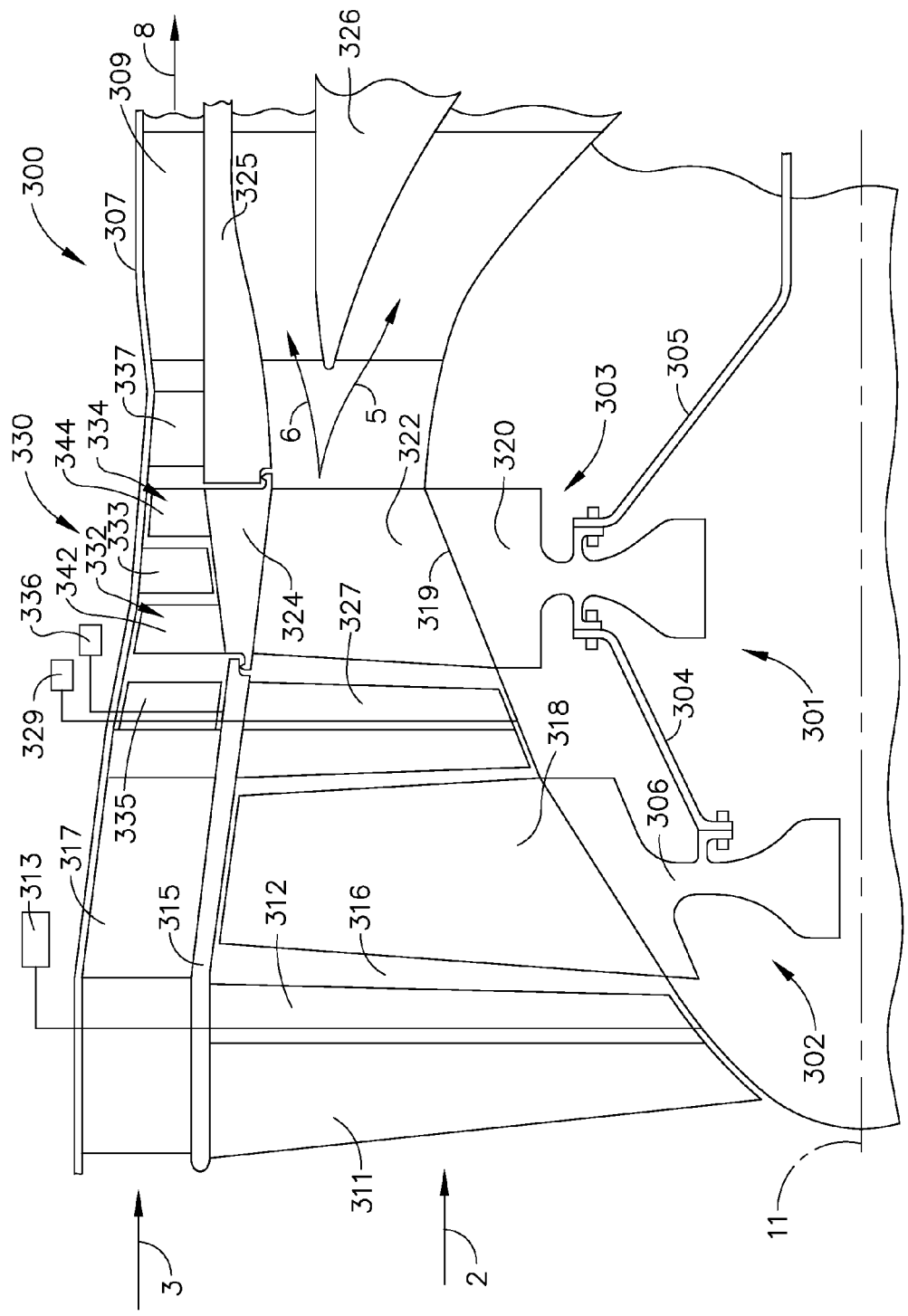
FIG. 4 is a schematic cross-sectional view of another embodiment of the present invention showing a co-rotating fan portion of a gas turbine engine having a rear fan stage constructed according to an aspect of the present invention.

FIG. 4 is a schematic cross-sectional view of another embodiment of the present invention showing a co-rotating fan portion of a gas turbine engine having a rear fan stage 303 constructed according to an aspect of the present invention. FIG. 4 shows a multi-stage fan system 301 comprising a first fan rotor 306 having a circumferential row of first stage fan blades 318 and driven by a first drive shaft 304 that is coupled to a second fan rotor 320. The second fan rotor 320 has a circumferential row of second stage fan blades 322 and is driven by a second drive shaft 305 that is driven by a low-pressure turbine (not shown). A circumferential row of vanes 327 is located axially aft from the first stage fan blades 318 and forward from the second stage fan blades 322. The vanes 327 reorient the flow exiting from the first fan stage 302 to flow into the second fan stage 303. Since the first fan stage and second fan stage are coupled (see item 304 in FIG. 4), they rotate in the same direction ("co-rotating"). The exemplary embodiment shown in FIG. 4 has an outer fan system 330 comprising an outer fan first stage 332 having a circumferential row of outer fan first blades 342, an outer fan second stage 334 having a circumferential row of outer fan second blades 344 located axially aft from the outer fan first stage 332 and a circumferential row of inter-stage vanes 333 located axially aft from the outer fan first stage 332 and a circumferential row of outer fan inlet guide vanes 335 located axially forward from the outer fan first stage 332. The outer fan inlet guide vanes 335 are optionally capable of changing the direction of flow of gas entering the outer fan first stage 332 using a known actuator 336 to change the stagger of the inlet guide vanes. Items shown by numerals 307, 309, 325 and 337 in FIG. 4 are similar to corresponding items described in FIG. 2.

Figure 5:
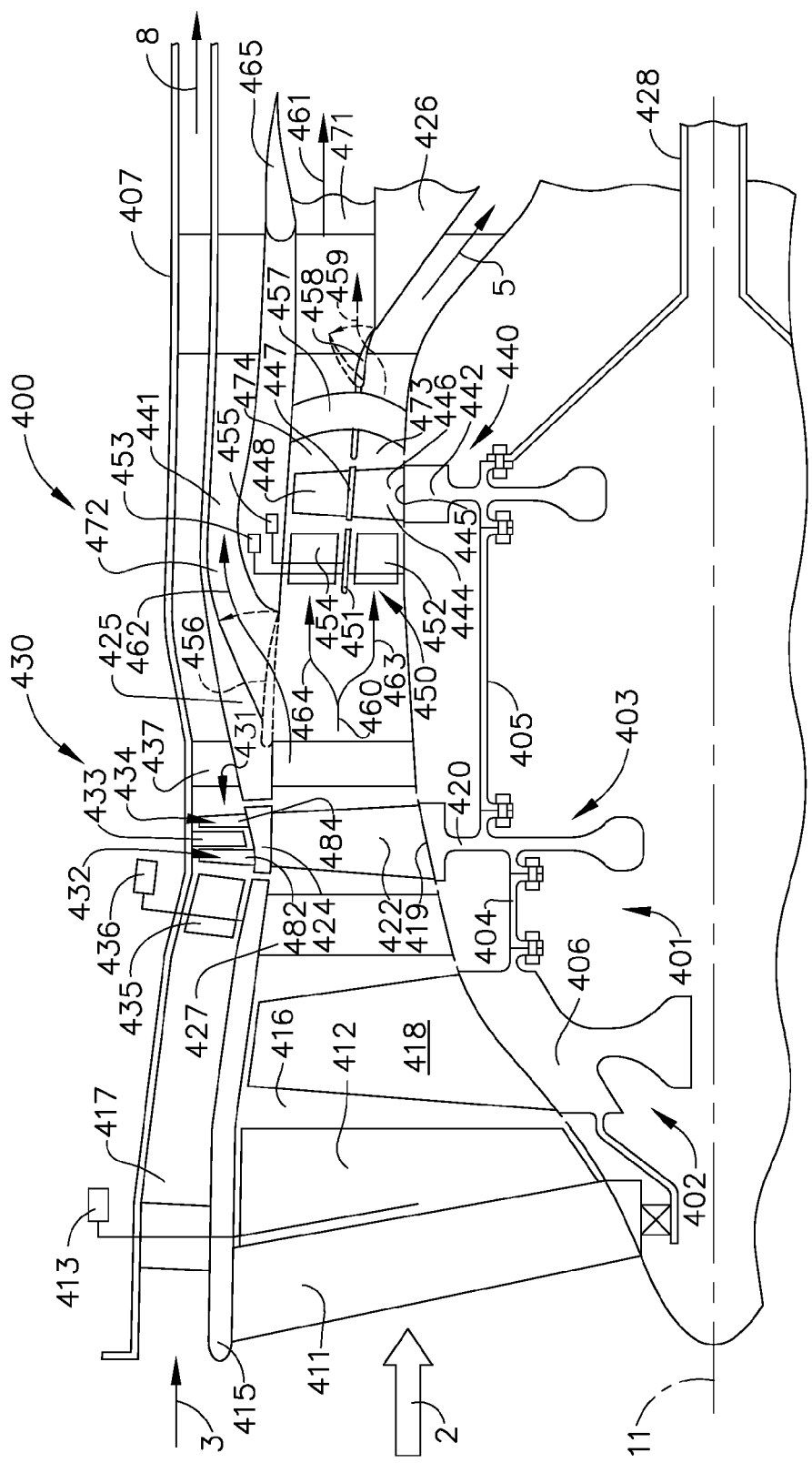
FIG. 5 is a schematic cross-sectional view of another embodiment of the present invention showing the fan portion of a gas turbine engine having a convertible fan according to another aspect of the present invention.

FIG. 5 shows a schematic cross-sectional view of another embodiment of the present invention showing the fan portion of a gas turbine engine having a convertible fan 440 according to another aspect of the present invention. A multi-stage fan system 401 is shown in FIG. 5 having a fan rotor 420 comprising a hub 419, plurality of fan blades 422, each blade 422 extending radially outward from the hub 419 and arranged circumferentially around a longitudinal axis 11. It has an outer fan system 430 substantially as described previously herein, comprising an outer fan first stage 432 having a circumferential row of outer fan first blades 482, an outer fan second stage 434 having a circumferential row of outer fan second blades 484 located axially aft from the outer fan first stage 432. In the exemplary embodiment shown in FIG. 5, the outer fan 431 is adapted to rotate with the fan rotor 420. The outer fan system 430 is adapted to raise the pressure of a flow stream 3 in an outer flow path 417, as described previously herein with respect to FIG. 2.

In some embodiments of the present invention, a multi-stage fan system 401, such as, for example, shown in FIG. 5, further comprises a convertible fan system 400 capable of varying the fan pressure ratios while the fan flow 2 remains substantially constant. In other embodiments, the multistage fan system may further comprise an adaptable core, similar to the convertible fan 400. In the exemplary embodiment shown in FIG. 5, the convertible fan system 400 has a convertible fan 440 located aft from the fan rotor 420 having a plurality of convertible fan blades 444 arranged circumferentially around the longitudinal axis 11 on a convertible fan hub 445. The convertible fan system 400 shown in FIG. 5 has an annular splitter 451 located axially forward from the convertible fan blades 444 capable of splitting an incoming flow 460 to an inner flow 463 and an outer flow 464. The convertible fan blade 444 has a radially inner portion 446 and a radially outer portion 448 separated by an arcuate shroud 447 wherein the inner portion 446 is adapted to pressurize the inner flow 463 and the outer portion 448 is adapted to pressurize the outer flow 464. A convertible fan vane system 450 is located axially forward from the convertible fan rotor 442. The vane system 450 has outer vanes 454, such as, for example, shown in FIG. 5. The outer vane 454 is capable of changing the direction of at least a portion of the outer flow 464 using an outer vane actuator 455 of a known type. In some applications, such as, for example, shown in FIG. 5, vane system 450 may also have an inner vane 452. The inner vane 452 may be variable vane, capable of changing the direction of at least a portion of the inner flow 463 using an inner vane actuator 453 of a known type.

As shown in FIG. 5, the convertible fan system 400 has an outlet guide vane (OGV) 437 located down stream from the convertible fan blades 444. The OGVs 437 substantially remove swirl from the flow exiting from the convertible fan rotor 442. the flow exiting from the convertible fan rotor 442. In some applications of the present invention, the multi-stage fan system 401 has a bypass door 458 (see FIG. 5) located down stream from the convertible fan blades 444 to enhance the operability and control of the fan system. In some applications of the present invention, the multi-stage fan system 401 may have a blocker door 456 (see FIG. 5) located down stream from the fan rotor 420 that is adapted to enhance the operability and control of the convertible fan system.

In the exemplary embodiment of the multi-stage fan system 401 shown in FIG. 5, a first fan rotor 406 is shown as coupled to second fan rotor 420 that is coupled to a convertible fan rotor 442 and the outer fan blades 482, 484 are carried by the second stage fan blades 422. In such an embodiment, the fan rotors 406, 420, 442 are driven by a low-pressure turbine shaft 428 coupled to a low-pressure turbine (not shown in FIG. 5). In this configuration, the fan rotors 406, 420, 442 are co-rotating in the same direction. In alternative embodiments of the present invention, such as shown in FIGS. 1, 2 and 3, a first fan rotor 106 is coupled to a first drive shaft 28 that is driven by a first low pressure turbine 20 and a second fan rotor 120 is coupled to a second drive shaft 26 that is driven by a second low pressure turbine 18. In such an alternative embodiment, the first fan rotor 106 and the second fan rotor 120 may be counter-rotating, in that they rotate in opposite rotational directions.

The outer fan system, such as for example shown in FIG. 2, and a convertible fan, such as, for example shown in FIG. 5, can be used in a gas turbine engine, such as for example, shown in FIG. 1. Such a gas turbine engine comprises a core 12 for generating a stream of pressurized combustion gases and has, in sequential order, a compressor 13, a combustor 15, a high pressure turbine 16, at least one low pressure turbine 20, at least one fan rotor 120 comprising a hub 119, plurality of fan blades 122 extending radially outward from the hub 119 and arranged circumferentially around a longitudinal axis 11. The gas turbine engine has an outer fan system 130 comprising an outer fan first stage 132 having a circumferential row of outer fan first blades 142, an outer fan second stage 134 having a circumferential row of outer fan second blades 144 located axially aft from the outer fan first stage 132. The outer fan first stage 132 and the outer fan second stage 134 are adapted to rotate with the fan rotor 120. A circumferential row of inter-stage vanes 133 are located axially aft from the outer fan first stage 132. A gas turbine engine 10 incorporating the outer fan system such as described above may optionally have a heat exchanger 500 adapted to either remove heat from the engine cooling air to reduce its temperature and/or to absorb and recoup waste heat energy various aircraft systems (see FIG. 1).

The various embodiments of the outer fan system shown herein show at least some of the advantages to mounting the multi-stage outer fan FLADE™ on the tip of a fan blade. The fan FLADE™ mounting enhances the installation of the engine, such as item 10 in FIG. 1, into an aircraft if the FLADE™ flow needs to be directed from the engine to a site remote from the engine, such as, for example, wing blowing or cooling. This enhancement is possible because the axial distance available to collect and redistribute the flow into one or more air off-takes is increased and thereby reduces the total pressure loss of the FLADE™ flow. Further, it may enhance the mixing ability of the FLADE™ flow with the core bypass flow for a double bypass (see FIG. 5 radially inner and outer bypass flow paths 471 and 472) engine using additional mixers as may be needed. The multi-stage FLADE™ disclosed herein can produce outer fan pressure ratios greater than the known capability of a single stage FLADE™. A multi-stage fan, such as disclosed herein, may have a FLADE™ stage mounted on the tip of one or more of the fan stages. Although a multistage fan is described herein, those skilled in the art would readily recognize that the multistage FLADE™ disclosed herein can be used in a single-stage fan as well. The preferred embodiment is to mount the multi-stage FLADE™ in the second fan stage, as shown in FIG. 2. A typical fan aft stage would have an inlet radius ratio well above the lower limit of fan system design, permitting the installation of the multi-stage FLADE™. More than two fan stages could also be employed in other embodiments using the counter-rotation configuration (see FIGS. 1, 2 and 3) or co-rotation configuration (see FIGS. 4 and 5). The preferred embodiment has an inlet guide vane system that is incorporated forward of the FLADE™ stages, as described previously herein. The purpose of the inlet guide vanes is to modulate the FLADE™ airflow at speed. Modulation of FLADE™ airflow also implies modulation of the flade pressure ratio, both of which alter the work required to drive the fan system.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A fan assembly comprising:
   first and second fan stages including first and second pluralities of first and second fan blades respectively arranged circumferentially around a longitudinal axis;
   an arcuate platform located on each of the second fan blades at a radially outward portion of the second fan blade, such that a portion of an annular fan inner flow path is defined in the fan assembly radially inwardly of the arcuate platform wherein the second fan blades are operable to increase the pressure of a fan flow stream flowing through the annular flow path;
   an outer fan system comprising an outer fan first stage having at least one outer fan first blade extending radially outward from the arcuate platform and an outer fan second stage comprising at least one outer fan second blade extending radially outward from the arcuate platform and located axially aft from the outer fan first stage;
   a convertible fan system operable for providing a variable fan pressure ratio while an air flow into the convertible fan system remains substantially constant;
   the convertible fan system including a convertible fan located aft of and operatively connected to the second fan stage;
   the convertible fan including a plurality of convertible fan blades arranged circumferentially around a longitudinal axis on a convertible fan hub;
   an annular splitter located axially forward from the convertible fan blades operable for splitting an incoming flow into an inner flow and an outer flow;
   each of the convertible fan blades includes a radially inner portion and a radially outer portion separated by an arcuate shroud and the inner portion is operable for pressurizing the inner flow and the outer portion is operable for pressurizing the outer flow; and
   a convertible fan vane system located axially forward from the convertible fan, the convertible vane system including outer vanes operable for changing an outer direction of at least a portion of the outer flow and an inner vane operable for changing an inner direction of at least a portion of the inner flow.

2. A fan assembly according to claim 1 further comprising a circumferential row of inter-stage vanes located axially aft from the outer fan first stage.

3. A fan assembly according to claim 1 wherein the outer fan system is operable to raise the pressure of an outer flow stream that flows through an outer flow path defined at least partially between an outer casing and the arcuate platform.

4. A fan assembly according to claim 1 further comprising a circumferential row of outer fan inlet guide vanes located axially forward from the outer fan first stage in the outer flow path.

5. A fan assembly according to claim 4 wherein the outer fan inlet guide vanes are operable for changing the direction of flow of gas entering the outer fan first stage using an actuator.

6. A fan assembly according to claim 1 further comprising an outer fan outlet guide vane located axially aft from the outer fan second stage.

7. A fan assembly according to claim 1 further comprising a circumferential row of inlet guide vanes located axially forward from the first fan stage and operable for changing the direction of at least a portion of the flow of gas entering the first fan stage using an actuator.

8. A fan assembly according to claim 7 further comprising a blocker door located downstream of the second fan stage and upstream from the convertible fan blades and a bypass door located downstream from the convertible fan blades.

9. A multi-stage fan system comprising:
   a first fan stage including a first stage fan rotor driven by a first drive shaft rotating in a first direction;
   a second fan stage including a second stage fan rotor driven by a second drive shaft rotating in a second direction;
   an outer fan system including an outer fan first stage having a circumferential row of outer fan first blades, an outer fan second stage having a circumferential row of outer fan second blades located axially aft from the outer fan first stage and a circumferential row of inter-stage vanes located axially aft from the outer fan first stage;
   the outer fan first blades and the outer fan second blades extend radially outward from an arcuate platform located on the second stage fan blade;
   a convertible fan system operable for providing a variable fan pressure ratio while an air flow into the convertible fan system remains substantially constant;

the convertible fan system including a convertible fan located aft of and operatively connected to the second stage fan rotor;

the convertible fan including a plurality of convertible fan blades arranged circumferentially around a longitudinal axis on a convertible fan hub;

an annular splitter located axially forward from the convertible fan blades operable for splitting an incoming flow into an inner flow and an outer flow;

each of the convertible fan blades includes a radially inner portion and a radially outer portion separated by an arcuate shroud and the inner portion is operable for pressurizing the inner flow and the outer portion is operable for pressurizing the outer flow; and a convertible fan vane system located axially forward from the convertible fan, the convertible vane system including outer vanes operable for changing an outer direction of at least a portion of the outer flow and an inner vane operable for changing an inner direction of at least a portion of the inner flow.

10. A multi-stage fan system according to claim 9 further comprising a circumferential row of outer fan inlet guide vanes located axially forward from the outer fan first stage.

11. A multi-stage fan system according to claim 10 wherein the outer fan inlet guide vanes are capable of changing the direction of flow of gas entering the outer fan first stage using an actuator to change the stagger of the outer fan inlet guide vanes.

12. A multi-stage fan system according to claim 9 further comprising an outer fan outlet guide vane located axially aft from the outer fan second stage.

13. A multi-stage fan system according to claim 9 further comprising a circumferential row of inlet guide vanes located axially forward from the first fan stage.

14. A multi-stage fan system according to claim 13 wherein the inlet guide vanes are capable of changing the direction of at least a portion of the flow of gas entering the first fan stage using an actuator to change the stagger of the inlet guide vanes.

15. A multi-stage fan system according to claim 9 further comprising a blocker door located downstream of the second fan stage and upstream from the convertible fan blades and a bypass door located downstream from the convertible fan blades.

16. A multi-stage fan system according to claim 15 further comprising: a radially inner bypass flowpath located aft of the convertible fan blades and a radially outer bypass flowpath located radially outward from the radially inner bypass flowpath; the blocker door operably located between an annular fan inner flowpath and the radially outer bypass flowpath, and the bypass door operably located between a core flow stream flowpath and the radially inner bypass flowpath to provide a varying amount of flow to the radially inner bypass flowpath from the core flow stream flowpath.

17. A multi-stage fan system comprising:
a first fan rotor including a circumferential row of first stage fan blades and driven by a first drive shaft coupled to a second fan rotor including a circumferential row of second stage fan blades, the second fan rotor driven by a second drive shaft;
a circumferential row of vanes located axially aft from the first stage fan blades and forward from the second stage fan blades;
an outer fan system including an outer fan first stage having a circumferential row of outer fan first blades, an outer fan second stage having a circumferential row of outer fan second blades located axially aft from the outer fan first stage and a circumferential row of inter-stage vanes located axially aft from the outer fan first stage;

the outer fan first blades and the outer fan second blades extend radially outward from an arcuate platform located on the second stage fan blades;

a convertible fan system operable for providing a variable fan pressure ratio while an air flow into the convertible fan system remains substantially constant;

the convertible fan system including a convertible fan located aft of and operatively connected to the second fan rotor;

the convertible fan including a plurality of convertible fan blades arranged circumferentially around a longitudinal axis on a convertible fan hub;

an annular splitter located axially forward from the convertible fan blades operable for splitting an incoming flow into an inner flow and an outer flow;

each of the convertible fan blades includes a radially inner portion and a radially outer portion separated by an arcuate shroud and the inner portion is operable for pressurizing the inner flow and the outer portion is operable for pressurizing the outer flow; and a convertible fan vane system located axially forward from the convertible fan, the convertible vane system including outer vanes operable for changing an outer direction of at least a portion of the outer flow and an inner vane operable for changing an inner direction of at least a portion of the inner flow.

18. A multi-stage fan system according to claim 17 further comprising a circumferential row of outer fan inlet guide vanes located axially forward from the outer fan first stage wherein the outer fan inlet guide vanes are capable of changing the direction of flow of gas entering the outer fan first stage using an actuator to change the stagger of the outer fan inlet guide vanes.

19. A multi-stage fan system according to claim 18 further comprising a blocker door located downstream of the second fan stage and upstream from the convertible fan blades and a bypass door located downstream from the convertible fan blades.

20. A gas turbine engine comprising:
a core for generating a stream of pressurized combustion gases, including in sequential order a compressor, a combustor, a high pressure turbine, at least one low pressure turbine;
first and second fan rotors coupled to first and second drive shafts drivenly connected to first and second low pressure turbines respectively;
an outer fan system including an outer fan first stage having a circumferential row of outer fan first blades, an outer fan second stage having a circumferential row of outer fan second blades located axially aft from the outer fan first stage wherein the outer fan first stage and the outer fan second stage are adapted to rotate with the second fan rotor;
the first fan rotor including a circumferential row of first stage fan blades and the second fan rotor including a circumferential row of second stage fan blades;
the outer fan first blades and the outer fan second blades extend radially outward from an arcuate platform located on the second stage fan blades;
a convertible fan system operable for providing a variable fan pressure ratio while an air flow into the convertible fan system remains substantially constant;
the convertible fan system including a convertible fan located aft of and operatively connected to the second fan stage;

the convertible fan including a plurality of convertible fan blades arranged circumferentially around a longitudinal axis on a convertible fan hub;

an annular splitter located axially forward from the convertible fan blades operable for splitting an incoming flow into an inner flow and an outer flow;

each of the convertible fan blades includes a radially inner portion and a radially outer portion separated by an arcuate shroud and the inner portion is operable for pressurizing the inner flow and the outer portion is operable for pressurizing the outer flow; and a convertible fan vane system located axially forward from the convertible fan, the convertible vane system including outer vanes operable for changing an outer direction of at least a portion of the outer flow and an inner vane operable for changing an inner direction of at least a portion of the inner flow.

21. A gas turbine engine according to claim 20 further comprising a circumferential row of inter-stage vanes located axially aft from the outer fan first stage.

22. A gas turbine engine according to claim 20 further comprising a blocker door located downstream of the second fan stage and upstream from the convertible fan blades and a bypass door located downstream from the convertible fan blades.

23. A gas turbine engine according to claim 20 wherein the first fan rotor rotates in a first direction and the second fan rotor rotates in a second direction.

24. A gas turbine engine according to claim 20 further comprising: a blocker door located downstream of the second fan stage and upstream from the convertible fan blades and a bypass door located downstream from the convertible fan blades, a radially inner bypass flowpath located aft of the convertible fan blades and a radially outer bypass flowpath located radially outward from the radially inner bypass flowpath; the blocker door operably located between an annular fan inner flowpath and the radially outer bypass flowpath; and the bypass door operably located between a core flow stream flowpath and the radially inner bypass flowpath to provide a varying amount of flow to the radially inner bypass flowpath from the core flow stream flowpath.

25. A gas turbine engine according to claim 20 wherein the outer fan system is operable to raise the pressure of a flow stream in an outer flow path.

26. A gas turbine engine according to claim 20 further comprising a heat exchanger adapted to remove heat from an outer exhaust stream.

27. A fan assembly comprising: an outer fan system including an outer fan first stage having at least one outer fan first blade extending radially outward from an arcuate platform on a fan blade and an outer fan second stage including at least one outer fan second blade extending radially outward from the arcuate platform; a convertible fan system downstream of the fan blade and adapted to have a variable fan pressure ratio while an air flow into the convertible fan system remains substantially constant; the convertible fan system including a convertible fan located aft from the second fan rotor and having a plurality of convertible fan blade arranged circumferentially around a longitudinal axis on a convertible fan hub; an annular splitter located axially forward from the convertible fan blades operable for splitting an incoming flow into an inner flow and an outer flow; each of the convertible fan blades includes a radially inner portion and a radially outer portion separated by an arcuate shroud and the inner portion is operable for pressurizing the inner flow and the outer portion is operable for pressurizing the outer flow; a convertible fan vane system located axially forward from the convertible fan, the convertible vane system including outer vanes operable for changing an outer direction of at least a portion of the outer flow and an inner vane operable for changing an inner direction of at least a portion of the inner flow; a blocker door located downstream of the second fan stage and upstream from the convertible fan blades and a bypass door located downstream from the convertible fan blades; a radially inner bypass flowpath located aft of the convertible fan blades and a radially outer bypass flowpath located radially outward from the radially inner bypass flowpath; the blocker door operably located between an annular fan inner flowpath and the radially outer bypass flowpath; and the bypass door operably located between a core flow stream flowpath and the radially inner bypass flowpath to provide a varying amount of flow to the radially inner bypass flowpath from the core flow stream flowpath.

* * * * *